United States Patent [19]
Liou et al.

[11] Patent Number: 5,381,590
[45] Date of Patent: Jan. 17, 1995

[54] CUSHIONING DEVICE OF CAR SAFETY BELT

[76] Inventors: Huei-Yu Liou, No. 11, Gaann-Tour Lane, Nan-Gaang Tsuen, Gwo-Shing Shiang, Nan-Tour Shiann, Taiwan, Prov. of China; Haw-Yaw Shy, No. 762, Sec. 1, Jong-Hwa Rd., Taidon City, Taidon Shiann, Taiwan, Prov. of China

[21] Appl. No.: 56,467

[22] Filed: May 5, 1993

[51] Int. Cl.6 ............................................ A44B 11/25
[52] U.S. Cl. .......................................... 24/602; 24/633
[58] Field of Search ................. 24/602, 115 F, 633, 24/635, 641

[56] References Cited
U.S. PATENT DOCUMENTS
5,121,527  6/1992  Righi ........................... 24/602

FOREIGN PATENT DOCUMENTS
2509616  1/1983  France ......................... 24/633
3233797  6/1983  Germany ...................... 24/633

Primary Examiner—James R. Brittain
Attorney, Agent, or Firm—Bacon & Thomas

[57] ABSTRACT

A cushioning device for a car safety belt comprises a female seat body and an insertion plate body. The female seat body has a receiving space, an insertion slot and two arresting portions. The insertion plate body has a coupling portion, a combination portion, and two serrated sides. The insertion plate body engages the female seat body such that the coupling portion passes through and beyond the insertion slot of the female seat body, and that the first tooth of the serrated sides engages the arresting portion of the female seat body. The serrated sides are ruptured by the arresting portions at the time when a thrust of inertia exerting on the safety belt exceeds the destruction strength of the serrated sides, so as to cause the coupling portion to move further out of the insertion slot in order to lengthen intermittently the strap buckling across the chest of a car occupant, thus absorbing the kinetic energy of the occupant.

5 Claims, 6 Drawing Sheets

CUSHIONING DEVICE OF CAR SAFETY BELT

FIELD OF THE INVENTION

The present invention relates to a car safety belt, and more particularly to a car safety belt having a cushioning device capable of enhancing the quality of mechanical action of the car safety belt.

BACKGROUND OF THE INVENTION

A car safety belt is a safety device for use in protecting a driver or a passenger from abrupt jolts by restraining the forward motion of inertia of the driver or the passenger. The anchored straps of the safety belt, which buckle accross the chest and the hip, bring about a reduction in the speed of the forward motion of inertia of the driver's body or the passenger's body. In the meantime, the neck of the driver or the passenger is being exerted on by a force that is needed to reduce the speed of the motion of the neck. The force is directly proportional to the quantity of the reduced speed. As a result, the safety of the driver or the passenger can be further enhanced by lowering the rate of the reduced speed, which in turn lessens the force exerting on the neck of the driver or the passenger.

SUMMARY OF THE INVENTION

It is therefore the primary objective of the present invention to provide a car safety belt with a cushioning device which comprises a female seat body and an insertion plate body. The female seat body is provided therein with a U-shaped receiving space, and an insertion slot having two sides, each of which forms an arresting portion. The insertion plate body is provided at the front portion thereof with a coupling portion corresponding in shape to a strap retainer and at the rear portion thereof with a combination portion of U-shaped construction. The combination portion is provided with a space for receiving therein the strap retainer and with two serrated sides. The insertion plate body is received in the receiving space of the female seat body such that the front end of the coupling portion extends beyond the insertion slot, and that the serrated sides engage the arresting portions of the female seat body. The arresting portions have a structural strength greater than that of the serrated sides. When the strap is fastened at the time when an incident takes place, the thrust of inertia exerting on the strap is greater than the destruction strength of the serrated sides. As a result, the serrated sides are destroyed orderly by the arresting portions. Therefore, the kinetic energy of the driver or the passenger is so absorbed that the rate of the reduced speed of the driver or the passenger is attenuated, thereby lengthening intermittently the disengaging distance between the coupling portion of the insertion plate body and the insertion slot of the female seat body. As a result, an appropriate buffer effect is brought about on the neck of the driver or the passenger.

It is another objective of the present invention to provide a car safety belt with a cushioning device comprising an insertion plate body made integrally of a tough material. The insertion plate body is provided with two serrated sides, each of which is provided with the deformable grooves having a predetermined destruction strength at the time when the serrated sides are obstructed by the arresting portions of the female seat body.

It is still another objective of the present invention to provide a car safety belt with a cushioning device comprising a female seat body provided with two connection slots in communication with each other for enhancing the engagement of the female seat body and the insertion plate body.

It is still another objective of the present invention to provide a car safety belt with a cushioning device comprising a female seat body provided with two connection slots, each of which is provide therein with a set of connection members made up of a female retaining member, a male retaining member and a fastening means. The female retaining member is provided at one end thereof with a protruded portion insertable into the connection slots of the female seat body to pass through the retaining hole of the strap retainer. The protruded portion has a fastening hole and a cooperating slot in communication with the fastening hole and a cooperating slot in communication with the fastening hole. The female retaining member has a protruded block opposite to the cooperating slot. The protruded block is provided therein with a threaded hole opposite to the fastening hole. Received in the fastening hole is the fastening means which fastens the protruded block by engaging the threaded hole of the protruded block. As a result, the female seat body is coupled securely with the insertion plate body in a simple and effective manner.

DETAILED DESCRIPTION OF THE INVENTION

Figure 1:
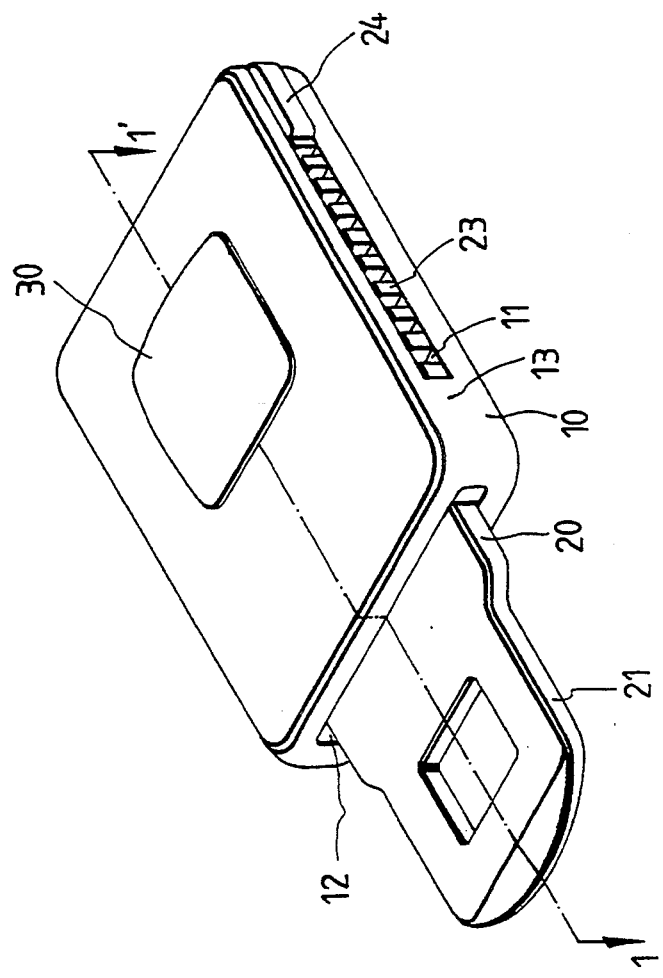
FIG. 1 shows a perspective view of the present invention.
Figure 2:
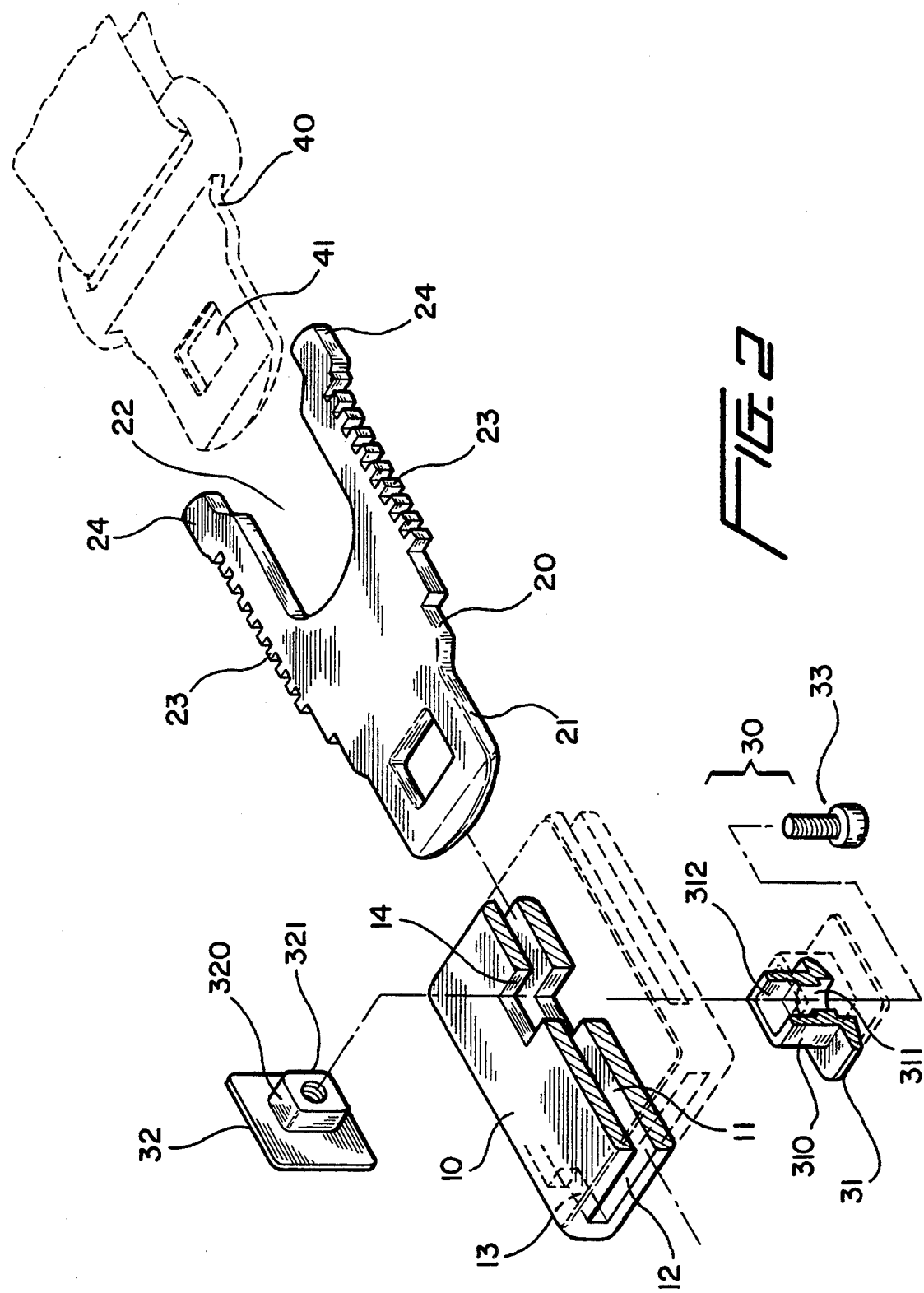
FIG. 2 shows an exploded view of the present invention.
Figure 3:
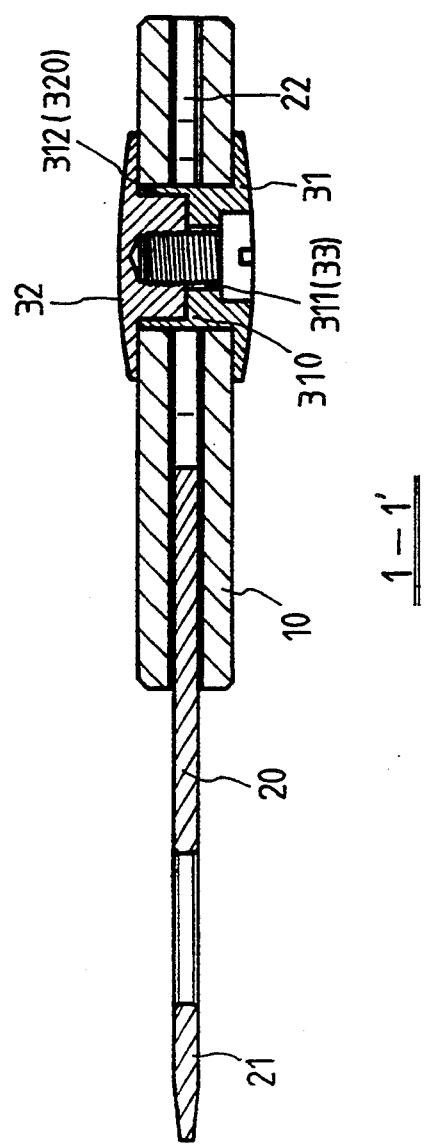
FIG. 3 shows a sectional view of the present invention in combination.

Referring to FIG. 1, 2 and 3, a cushioning device of a car safety belt of the present invention is shown to comprise a female seat body 10, an insertion plate body 20, and a combination retainer assembly 30.

The female seat body 10 is provided therein with a U-shaped receiving space 11 and an insertion slot 12 having two sides, each of which forms an arresting portion 13. The upper and the lower sides of the seat body, where the receiving space 11 is located, are provided respectively at an appropriate position with a connection slot 14.

The insertion plate body 20 of an iron plate or a steel plate is coverd with a plastic material by injection molding. The insertion plate body 20 is provided at the front portion thereof with a coupling portion 21 corresponding in shape and size to a strap retainer 40, and at the rear portion thereof with a U-shaped combination portion having an insertion space 22 and two serrated sides 23 of plastic material. Each of the two serrated sides 23 is provided at the tail portion thereof with a restraining portion 24 of a metal material.

In combination, the insertion plate body 20 is lodged in the receiving space 11 of the female seat body 10 in such a manner that the front end of the coupling portion 21 of the insertion plate body 20 passes through and beyond the insertion slot 12 of the female seat body 10, and that the two serrated sides 23 of the insertion plate body 20 engage respectively the two arresting portions 13 of the female seat body 10. Each of the two serrated sides 23 is made of a reinforced plastic material such as a fiber reinforced plastic material by injection molding. The serrated sides 23 are so constructed that each of their teeth has a destruction strength of about 30 Pounds. Each of the two arresting portions 13 is made of a metal material and provided with a destruction strength greater than that of the teeth of the serrated sides 23. The female seat body 10 can be coupled with the strap retainer 40 by means of the combination member 30.

The combination retainer assembly 30 is composed of a female retaining member 31, a male retaining member 32, and a fastening member 33. The female retaining member 31 is provided at one end thereof with a protruded portion 310 which is dimensioned to fit into the connection slot 14 of the female seat body 10 in such a manner that the protruded portion 310 can be caused to pass through the connection slot 14 so as to be received in a retaining hole 41 of the strap retainer 40 which is located in the insertion space 22 of the insertion plate body 20. The protruded portion 310 is provided therein with a fastening hole 311 and a cooperating slot 312 in commumication with the fastening hole 311. The male retaining member 32 is provided at one end thereof with a projection 320 corresponding in shape to the cooperating groove 312 of the female retaining member 31. The projection 320 is received in the cooperating slot 312 via the connection slot 14 of the female seat body 10. The projection 320 has a threaded hole 321 corresponding in location to the fastening hole 311 of the female retaining member 31. The female retaining member 31 is fastened with the male retaining member 32 by means of a fastener 33 which engages the threaded hole 321 of the projection 320 via the fastening hole 311. As a result, the female seat body 10 is coupled with the strap retainer 40 such that they do not disengage accidentally.

Figure 4:
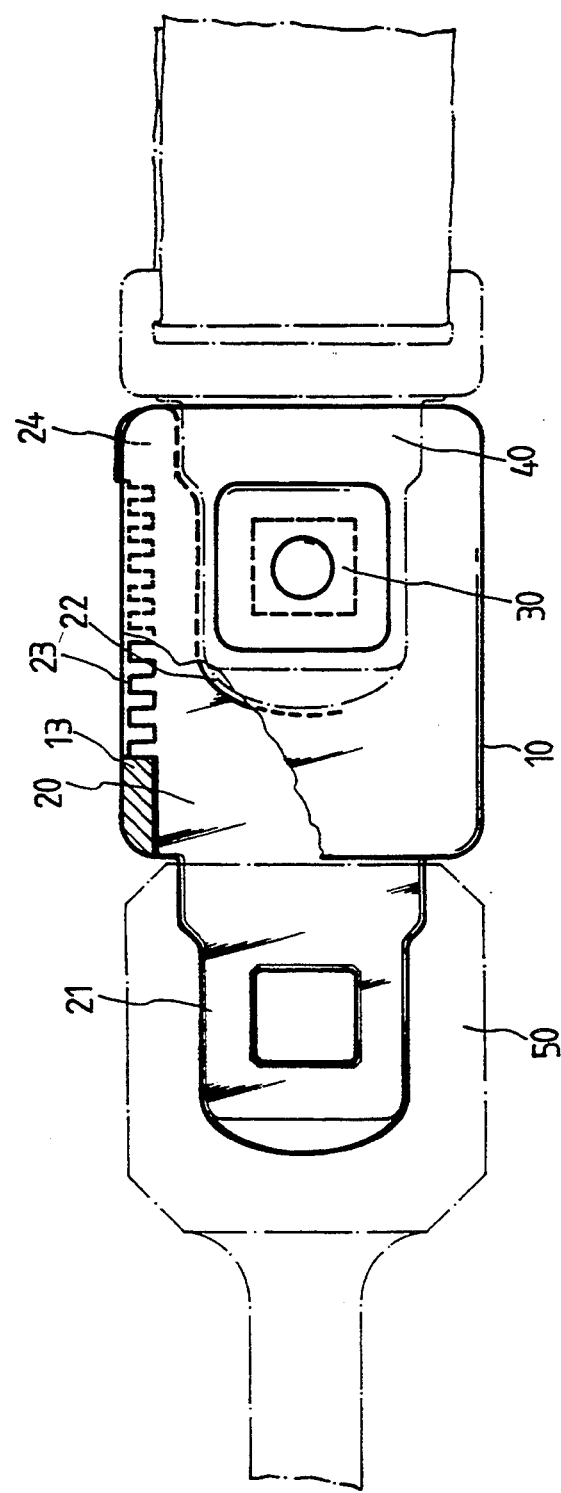
FIG. 4 is a schematic view showing the combination relationship between the strap female retaining member and the strap retainer.
Figure 5:
FIG. 5 shows a schematic view of the present invention in operation.
Figure 7:
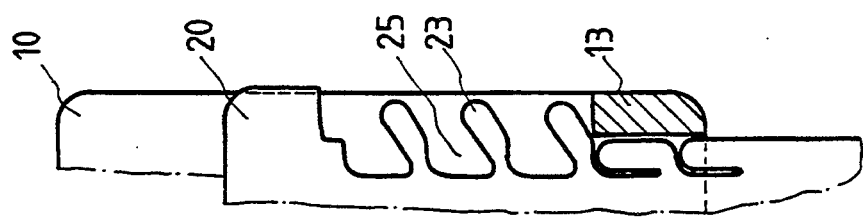
FIG. 7 shows a schematic view of the deformed serrated sides of the insertion plate body of the present invention.

As shown in FIGS. 4 and 5, the car safety belt can be easily fastened by putting the coupling portion 21 of the insertion plate body 20 through the insertion slot 12 of the female seat body 10 so as to engage securely a female retainer 50 of the safety belt. This approach of fastening the car safety belt is in fact similar to that of fastening the prior art safety belt.

The protective mechanism of the cushioning device of the car safety belt of the present invention described above will not be activated at the time when an abrupt jolt takes place in a car traveling at a moderate speed. In other words, the neck of the driver or the passenger of the car will not be hurt by such an abrupt jolt as mentioned above, on the grounds that the thrust of inertia exerting on the safety belt is not in excess of the destruction strength of the serrated sides 23 of the insertion plate body 20.

On the other hand, if an abrupt jolt takes place in a car traveling at a high speed, the thrust of inertia exerting on the safety belt is likely to be in excess of the destruction strength of the serrated sides 23 of the insertion plate body 20, thereby increasing the chance that the neck of the driver or the passenger of the car is hurt. However, under the circumstance described above, the teeth of the serrated sides 23 of the insertion plate body 20 are sequentially ruptured by the arresting portions 13 of the female seat body 10 in accordance with the magnitude of the thrust of inertia exerting on the safety belt. It must be noted here that the number of the teeth of the serrated sides 23 is directly proportional to the magnitude of the thrust of inertia exerting on the safety belt. As a result, the coupling portion 21 of the insertion plate body 20 is caused to extend further out of the insertion slot 12 of the female seat body 10, thereby increasing intermittently the length of the anchored strap buckling across the chest of the driver or the passenger, so as to protect the driver's neck or the passenger's neck by absorbing the kinetic energy of the driver or the passenger in order to reduce the motion of inertia of the driver or the passenger. Under the circumstance in which an extremely violent jolt takes place in a car, it is likely that all the teeth of the serrated sides 23 are overwhelmed to an extent that the serrated sides 23 are no longer able to bring about a buffering effect. However, each of the two serrated sides 23 is provided at the rear end thereof with a restraining portion 24 which is capable of engaging the arresting portion 13 of the female seat body 10 so as to ensure that the safety belt remains fastened securely.

Figure 6:
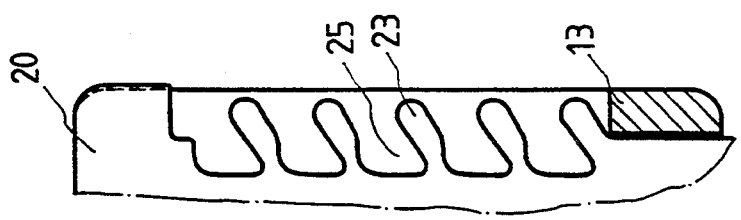
FIG. 6 shows a schematic view of the serrated sides of the insertion plate body in operation, according to the present invention.

The insertion plate body 20 may be made integrally of a tough material such as metal. Each of the teeth making up the serrated sides 23 of the insertion plate body 20 is constructed obliquely, as shown in FIG. 6. Located between the two teeth is a deformation groove 25, which allows the serrated side 23 to have a predetermined deformation destruction strength at the time when the serrated side 23 is stopped by the arresting portion 13 of the female seat body 10.

The embodiment of the present invention described above is to be regarded in all respects as merely illustrative and not restrictive. Accordingly, the present invention may be embodied in other specific forms without deviating from the spirit thereof. Therefore, the present invention is to be limited only by the scope of the following appended claims.

What is claimed is:

1. A cushioning device for attachment to the strap retainer of a car safety belt to absorb kinetic energy of a car occupant using the safety belt, the cushioning device comprising:

a) a female seat body including a receiving space therein, a front end and a rear end, an insertion slot at the front end and an arresting portion disposed at each of two interior sides of the receiving space;

b) an insertion plate including a front end and a rear end, the front end forming a coupling portion corresponding in configuration to a strap retainer of a car safety belt, a U-shaped insertion space at the rear end for receiving a strap retainer therein, and two serrated sides, each serrated side including a plurality of serrations extending between the front and rear ends of the plate;

c) means for securing the insertion plate and the strap retainer within the receiving space of the seat body, with the coupling portion of the insertion plate extending outwardly from the insertion slot and a first serration of each serrated side against an arresting portion; and d) the serrations of each serrated side having a lower destruction strength than the arresting portions to permit the insertion plate to be pulled outwardly through the insertion slot of the female body upon application of a predetermined force on the car safety belt for sequentially rupturing the serrations and lengthening the safety belt, thereby absorbing the kinetic energy of the occupant.

2. The cushioning device of claim 1 wherein the insertion plate further includes a restraining means at the rear end thereof for engaging the arresting portion and preventing removal of the insertion plate from the female body after all of the serrations of the serrated sides have ruptured.

3. The cushioning device of claim 1 wherein the means for securing the insertion plate and the strap retainer within the receiving space of the female seat body includes a combination retainer assembly comprising:
   a) a pair of aligned connection slots formed in a pair of opposed wall portions of the female seat body;
   b) a male retaining member and a female retaining member engagable through the connection slots from opposite sides of the seat body for extending through a retaining hole formed in the strap retainer; and
   c) a fastening member for securing the male and the female retaining members together.

4. The cushioning device of claim 1 wherein the serrated sides each includes a plurality of deformation grooves, with each groove being positioned between two adjacent serrations.

5. The cushioning device of claim 1 wherein the insertion plate is formed of metal and each serrated side is formed of plastic.

* * * * *